(12) United States Patent
Thomas

(10) Patent No.: US 11,328,360 B2
(45) Date of Patent: May 10, 2022

(54) SYSTEMS AND METHODS FOR AUTOMATED TRADING

(71) Applicant: UST Global Inc., Aliso Viejo, CA (US)

(72) Inventor: Kurien Cherian Thomas, Chathannoor (IN)

(73) Assignee: UST Global Inc, Aliso Viejo, CA (US)

( * ) Notice: Subject to any disclaimer, the term of this patent is extended or adjusted under 35 U.S.C. 154(b) by 0 days.

(21) Appl. No.: 16/888,146

(22) Filed: May 29, 2020

(65) Prior Publication Data
US 2021/0174449 A1 Jun. 10, 2021

(30) Foreign Application Priority Data

Dec. 5, 2019 (IN) .............................. 201911050190

(51) Int. Cl.
G06Q 40/06 (2012.01)
G06K 9/62 (2022.01)
G06N 3/08 (2006.01)

(52) U.S. Cl.
CPC ............ *G06Q 40/06* (2013.01); *G06K 9/623* (2013.01); *G06N 3/08* (2013.01)

(58) Field of Classification Search
CPC ........... G06Q 40/06; G06N 3/08; G06K 9/623
USPC .......................................................... 705/35
See application file for complete search history.

(56) References Cited

U.S. PATENT DOCUMENTS

| | | | | |
|---|---|---|---|---|
| 2006/0235786 A1* | 10/2006 | DiSalvo | ................. | G06Q 40/04 705/37 |
| 2007/0100722 A1* | 5/2007 | Ferguson | ............... | G06Q 40/00 705/36 R |
| 2016/0071212 A1* | 3/2016 | Beaumont | ............. | G06Q 40/06 705/36 R |
| 2018/0089762 A1* | 3/2018 | Lopez | .................... | G06Q 40/06 |

* cited by examiner

*Primary Examiner* — Lindsay M Maguire
(74) *Attorney, Agent, or Firm* — Nixon Peabody LLP

(57) ABSTRACT

A system configured to: (a) retrieve structured and unstructured data from one or more external data sources, the structured data including time-series data on a financial instrument and the unstructured data including words; (b) analyze the unstructured data to determine a sentiment measure for the financial instrument; (c) analyze the structured data to obtain a training dataset; (d) train a neural network model with the training dataset such that the neural network can provide a predicted price of the financial instrument for a future timestamp; and (e) provide a decision for managing the financial instrument based at least in part on the sentiment measure for the financial instrument, the predicted price of the financial instrument, and a current holding of the financial instrument.

16 Claims, 10 Drawing Sheets

| Trading Action | Neural Network Recommendation | Natural Language Processor Recommendation | State of Investment |
|---|---|---|---|
| Buy | 1 | 1 | Profit |
| Buy | 0.75 | 1 | Profit |
| Buy | 0.5 | 1 | Profit |
| Buy | 0.25 | 1 | Profit |
| Buy | 0 | 1 | Profit |
| Buy | -0.25 | 1 | Profit |
| Hold | -0.5 | 1 | Profit |
| Hold | -0.75 | 1 | Profit |
| Hold | -1 | 1 | Profit |
| Buy | 1 | 0.75 | Profit |
| Buy | 0.75 | 0.75 | Profit |
| Buy | 0.5 | 0.75 | Profit |
| Buy | 0.25 | 0.75 | Profit |
| Buy | 0 | 0.75 | Profit |
| Hold | -0.25 | 0.75 | Profit |
| Hold | -0.5 | 0.75 | Profit |
| Hold | -0.75 | 0.75 | Profit |
| Hold | -1 | 0.75 | Profit |
| Buy | 1 | 0.5 | Profit |
| Buy | 0.75 | 0.5 | Profit |
| Buy | 0.5 | 0.5 | Profit |
| Buy | 0.25 | 0.5 | Profit |
| Buy | 0 | 0.5 | Profit |
| Hold | -0.25 | 0.5 | Profit |
| Hold | -0.5 | 0.5 | Profit |
| Hold | -0.75 | 0.5 | Profit |
| Hold | -1 | 0.5 | Profit |
| Buy | 1 | 0.25 | Profit |
| Buy | 0.75 | 0.25 | Profit |
| Buy | 0.5 | 0.25 | Profit |
| Buy | 0.25 | 0.25 | Profit |
| Buy | 0 | 0.25 | Profit |
| Hold | -0.25 | 0.25 | Profit |
| Hold | -0.5 | 0.25 | Profit |
| Hold | -0.75 | 0.25 | Profit |
| Sell | -1 | 0.25 | Profit |
| Buy | 1 | 0 | Profit |
| Buy | 0.75 | 0 | Profit |
| Buy | 0.5 | 0 | Profit |
| Buy | 0.25 | 0 | Profit |
| Hold | 0 | 0 | Profit |

FIG. 5A

| | | | |
|---|---|---|---|
| Hold | -0.25 | 0 | Profit |
| Sell | -0.5 | 0 | Profit |
| Sell | -0.75 | 0 | Profit |
| Sell | -1 | 0 | Profit |
| Hold | 1 | -0.25 | Profit |
| Hold | 0.75 | -0.25 | Profit |
| Hold | 0.5 | -0.25 | Profit |
| Hold | 0.25 | -0.25 | Profit |
| Hold | 0 | -0.25 | Profit |
| Sell | -0.25 | -0.25 | Profit |
| Sell | -0.5 | -0.25 | Profit |
| Sell | -0.75 | -0.25 | Profit |
| Sell | -1 | -0.25 | Profit |
| Hold | 1 | -0.5 | Profit |
| Hold | 0.75 | -0.5 | Profit |
| Hold | 0.5 | -0.5 | Profit |
| Hold | 0.25 | -0.5 | Profit |
| Sell | 0 | -0.5 | Profit |
| Sell | -0.25 | -0.5 | Profit |
| Sell | -0.5 | -0.5 | Profit |
| Sell | -0.75 | -0.5 | Profit |
| Sell | -1 | -0.5 | Profit |
| Hold | 1 | -0.75 | Profit |
| Hold | 0.75 | -0.75 | Profit |
| Hold | 0.5 | -0.75 | Profit |
| Sell | 0.25 | -0.75 | Profit |
| Sell | 0 | -0.75 | Profit |
| Sell | -0.25 | -0.75 | Profit |
| Sell | -0.5 | -0.75 | Profit |
| Sell | -0.75 | -0.75 | Profit |
| Sell | -1 | -0.75 | Profit |
| Hold | 1 | -1 | Profit |
| Sell | 0.75 | -1 | Profit |
| Hold | 0.5 | -1 | Profit |
| Sell | 0.25 | -1 | Profit |
| Sell | 0 | -1 | Profit |
| Sell | -0.25 | -1 | Profit |
| Sell | -0.5 | -1 | Profit |
| Sell | -0.75 | -1 | Profit |
| Sell | -1 | -1 | Profit |
| Buy | 1 | 1 | Loss |
| Buy | 0.75 | 1 | Loss |
| Buy | 0.5 | 1 | Loss |
| Buy | 0.25 | 1 | Loss |

FIG. 5B

| | | | |
|---|---|---|---|
| Hold | 0 | 1 | Loss |
| Hold | -0.25 | 1 | Loss |
| Hold | -0.5 | 1 | Loss |
| Hold | -0.75 | 1 | Loss |
| Hold | -1 | 1 | Loss |
| Buy | 1 | 0.75 | Loss |
| Buy | 0.75 | 0.75 | Loss |
| Buy | 0.5 | 0.75 | Loss |
| Buy | 0.25 | 0.75 | Loss |
| Hold | 0 | 0.75 | Loss |
| Hold | -0.25 | 0.75 | Loss |
| Hold | -0.5 | 0.75 | Loss |
| Hold | -0.75 | 0.75 | Loss |
| Hold | -1 | 0.75 | Loss |
| Buy | 1 | 0.5 | Loss |
| Buy | 0.75 | 0.5 | Loss |
| Buy | 0.5 | 0.5 | Loss |
| Buy | 0.25 | 0.5 | Loss |
| Hold | 0 | 0.5 | Loss |
| Hold | -0.25 | 0.5 | Loss |
| Hold | -0.5 | 0.5 | Loss |
| Hold | -0.75 | 0.5 | Loss |
| Hold | -1 | 0.5 | Loss |
| Buy | 1 | 0.25 | Loss |
| Buy | 0.75 | 0.25 | Loss |
| Buy | 0.5 | 0.25 | Loss |
| Hold | 0.25 | 0.25 | Loss |
| Hold | 0 | 0.25 | Loss |
| Hold | -0.25 | 0.25 | Loss |
| Hold | -0.5 | 0.25 | Loss |
| Hold | -0.75 | 0.25 | Loss |
| Hold | -1 | 0.25 | Loss |
| Hold | 1 | 0 | Loss |
| Hold | 0.75 | 0 | Loss |
| Hold | 0.5 | 0 | Loss |
| Hold | 0.25 | 0 | Loss |
| Hold | 0 | 0 | Loss |
| Hold | -0.25 | 0 | Loss |
| Hold | -0.5 | 0 | Loss |
| Hold | -0.75 | 0 | Loss |
| Hold | -1 | 0 | Loss |
| Hold | 1 | -0.25 | Loss |
| Hold | 0.75 | -0.25 | Loss |
| Hold | 0.5 | -0.25 | Loss |

FIG. 5C

| | | | |
|---|---|---|---|
| Hold | 0.25 | -0.25 | Loss |
| Hold | 0 | -0.25 | Loss |
| Hold | -0.25 | -0.25 | Loss |
| Sell | -0.5 | -0.25 | Loss |
| Sell | -0.75 | -0.25 | Loss |
| Sell | -1 | -0.25 | Loss |
| Hold | 1 | -0.5 | Loss |
| Hold | 0.75 | -0.5 | Loss |
| Hold | 0.5 | -0.5 | Loss |
| Hold | 0.25 | -0.5 | Loss |
| Hold | 0 | -0.5 | Loss |
| Sell | -0.25 | -0.5 | Loss |
| Sell | -0.5 | -0.5 | Loss |
| Sell | -0.75 | -0.5 | Loss |
| Sell | -1 | -0.5 | Loss |
| Hold | 1 | -0.75 | Loss |
| Hold | 0.75 | -0.75 | Loss |
| Hold | 0.5 | -0.75 | Loss |
| Hold | 0.25 | -0.75 | Loss |
| Hold | 0 | -0.75 | Loss |
| Sell | -0.25 | -0.75 | Loss |
| Sell | -0.5 | -0.75 | Loss |
| Sell | -0.75 | -0.75 | Loss |
| Sell | -1 | -0.75 | Loss |
| Hold | 1 | -1 | Loss |
| Hold | 0.75 | -1 | Loss |
| Hold | 0.5 | -1 | Loss |
| Hold | 0.25 | -1 | Loss |
| Hold | 0 | -1 | Loss |
| Sell | -0.25 | -1 | Loss |
| Sell | -0.5 | -1 | Loss |
| Sell | -0.75 | -1 | Loss |
| Sell | -1 | -1 | Loss |
| Buy | 1 | 1 | Cash |
| Buy | 0.75 | 1 | Cash |
| Buy | 0.5 | 1 | Cash |
| Buy | 0.25 | 1 | Cash |
| Buy | 0 | 1 | Cash |
| Buy | -0.25 | 1 | Cash |
| Hold | -0.5 | 1 | Cash |
| Hold | -0.75 | 1 | Cash |
| Hold | -1 | 1 | Cash |
| Buy | 1 | 0.75 | Cash |
| Buy | 0.75 | 0.75 | Cash |

FIG. 5D

| | | | |
|---|---|---|---|
| Buy | 0.5 | 0.75 | Cash |
| Buy | 0.25 | 0.75 | Cash |
| Buy | 0 | 0.75 | Cash |
| Hold | -0.25 | 0.75 | Cash |
| Hold | -0.5 | 0.75 | Cash |
| Hold | -0.75 | 0.75 | Cash |
| Hold | -1 | 0.75 | Cash |
| Buy | 1 | 0.5 | Cash |
| Buy | 0.75 | 0.5 | Cash |
| Buy | 0.5 | 0.5 | Cash |
| Buy | 0.25 | 0.5 | Cash |
| Buy | 0 | 0.5 | Cash |
| Hold | -0.25 | 0.5 | Cash |
| Hold | -0.5 | 0.5 | Cash |
| Hold | -0.75 | 0.5 | Cash |
| Hold | -1 | 0.5 | Cash |
| Buy | 1 | 0.25 | Cash |
| Buy | 0.75 | 0.25 | Cash |
| Buy | 0.5 | 0.25 | Cash |
| Buy | 0.25 | 0.25 | Cash |
| Buy | 0 | 0.25 | Cash |
| Hold | -0.25 | 0.25 | Cash |
| Hold | -0.5 | 0.25 | Cash |
| Hold | -0.75 | 0.25 | Cash |
| Hold | -1 | 0.25 | Cash |
| Buy | 1 | 0 | Cash |
| Buy | 0.75 | 0 | Cash |
| Buy | 0.5 | 0 | Cash |
| Buy | 0.25 | 0 | Cash |
| Hold | 0 | 0 | Cash |
| Sell | -0.25 | 0 | Cash |
| Sell | -0.5 | 0 | Cash |
| Sell | -0.75 | 0 | Cash |
| Sell | -1 | 0 | Cash |
| Buy | 1 | -0.25 | Cash |
| Hold | 0.75 | -0.25 | Cash |
| Hold | 0.5 | -0.25 | Cash |
| Hold | 0.25 | -0.25 | Cash |
| Sell | 0 | -0.25 | Cash |
| Sell | -0.25 | -0.25 | Cash |
| Sell | -0.5 | -0.25 | Cash |
| Sell | -0.75 | -0.25 | Cash |
| Sell | -1 | -0.25 | Cash |
| Hold | 1 | -0.5 | Cash |

FIG. 5E

| Hold | 0.75 | -0.5 | Cash |
|------|------|------|------|
| Hold | 0.5 | -0.5 | Cash |
| Hold | 0.25 | -0.5 | Cash |
| Sell | 0 | -0.5 | Cash |
| Sell | -0.25 | -0.5 | Cash |
| Sell | -0.5 | -0.5 | Cash |
| Sell | -0.75 | -0.5 | Cash |
| Sell | -1 | -0.5 | Cash |
| Hold | 1 | -0.75 | Cash |
| Hold | 0.75 | -0.75 | Cash |
| Hold | 0.5 | -0.75 | Cash |
| Hold | 0.25 | -0.75 | Cash |
| Sell | 0 | -0.75 | Cash |
| Sell | -0.25 | -0.75 | Cash |
| Sell | -0.5 | -0.75 | Cash |
| Sell | -0.75 | -0.75 | Cash |
| Sell | -1 | -0.75 | Cash |
| Hold | 1 | -1 | Cash |
| Hold | 0.75 | -1 | Cash |
| Hold | 0.5 | -1 | Cash |
| Hold | 0.25 | -1 | Cash |
| Sell | 0 | -1 | Cash |
| Sell | -0.25 | -1 | Cash |
| Sell | -0.5 | -1 | Cash |
| Sell | -0.75 | -1 | Cash |
| Sell | -1 | -1 | Cash |

FIG. 5F

SYSTEMS AND METHODS FOR AUTOMATED TRADING

CROSS-REFERENCE TO RELATED APPLICATIONS

This application claims the benefit of and claims priority to Indian Provisional Application No. 201911050190, filed Dec. 5, 2019, which is herein incorporated by reference in its entirety.

TECHNICAL FIELD

The present disclosure relates to automated trading and more specifically to systems and methods that intelligently automate financial trading using both structured and unstructured data.

BACKGROUND

In Western markets, such as the U.S. market, due to lower interest rates, the population's investment money flows into financial instruments. In developing nations' markets, such as Indian markets, due to higher interest rates, more investment money flows into fixed deposits compared to financial instruments. Investment in financial instruments, such as shares, bonds, commodities, Forex, index points, etc., are subject to risk without a guaranteed fixed return. Due to a large volume of assets being exchanged in financial instrument markets, investment banks and other institutional players eventually moved into software-based algorithmic trading in order to handle trading efficiently. Following the trend, a majority of the trading activities slowly began being handled by algorithmic trading, and hence, majority of the money in financial markets is controlled by software-based algorithmic trading. Most software-based algorithmic trading is performed by high frequency trading.

The present disclosure provides systems and methods for managing financial instruments in an automated trading environment. The present disclosure handles both structured and unstructured data, thus providing advantages not present in other software-based algorithmic trading systems.

SUMMARY

According to some implementations of the present disclosure a system for managing financial instruments is provided. The system includes a non-transitory computer-readable medium storing computer-executable instructions thereon such that when the instructions are executed, the system is configured to: (a) retrieve, via at least one application programming interface (API), structured and unstructured data from one or more external data sources, the structured data including time-series data on a financial instrument and the unstructured data including words of titles, sentences, paragraphs, or any combination thereof; (b) analyze the unstructured data to determine a sentiment measure for the financial instrument; (c) analyze the structured data to obtain a training dataset, the structured data including historical data associated with the financial instruments and current data associated with the financial instruments, wherein historical data pertains to data describing prices of the financial instruments in one or more previous timestamps and current data pertains to data describing price of the financial instrument at a current timestamp; (d) train a neural network model with the training dataset such that the neural network can provide a predicted price of the financial instrument for a future timestamp given the price of the financial instrument at the current timestamp; and (e) provide a decision for managing the financial instrument based at least in part on the sentiment measure for the financial instrument, the predicted price of the financial instrument, and a current holding of the financial instrument.

The foregoing and additional aspects and implementations of the present disclosure will be apparent to those of ordinary skill in the art in view of the detailed description of various embodiments and/or implementations, which is made with reference to the drawings, a brief description of which is provided next.

BRIEF DESCRIPTION OF THE DRAWINGS

The foregoing and other advantages of the present disclosure will become apparent upon reading the following detailed description and upon reference to the drawings.

FIGS. 5A-5F illustrate sections of a table showing trading results according to some implementations of the present disclosure.

Figure 1:
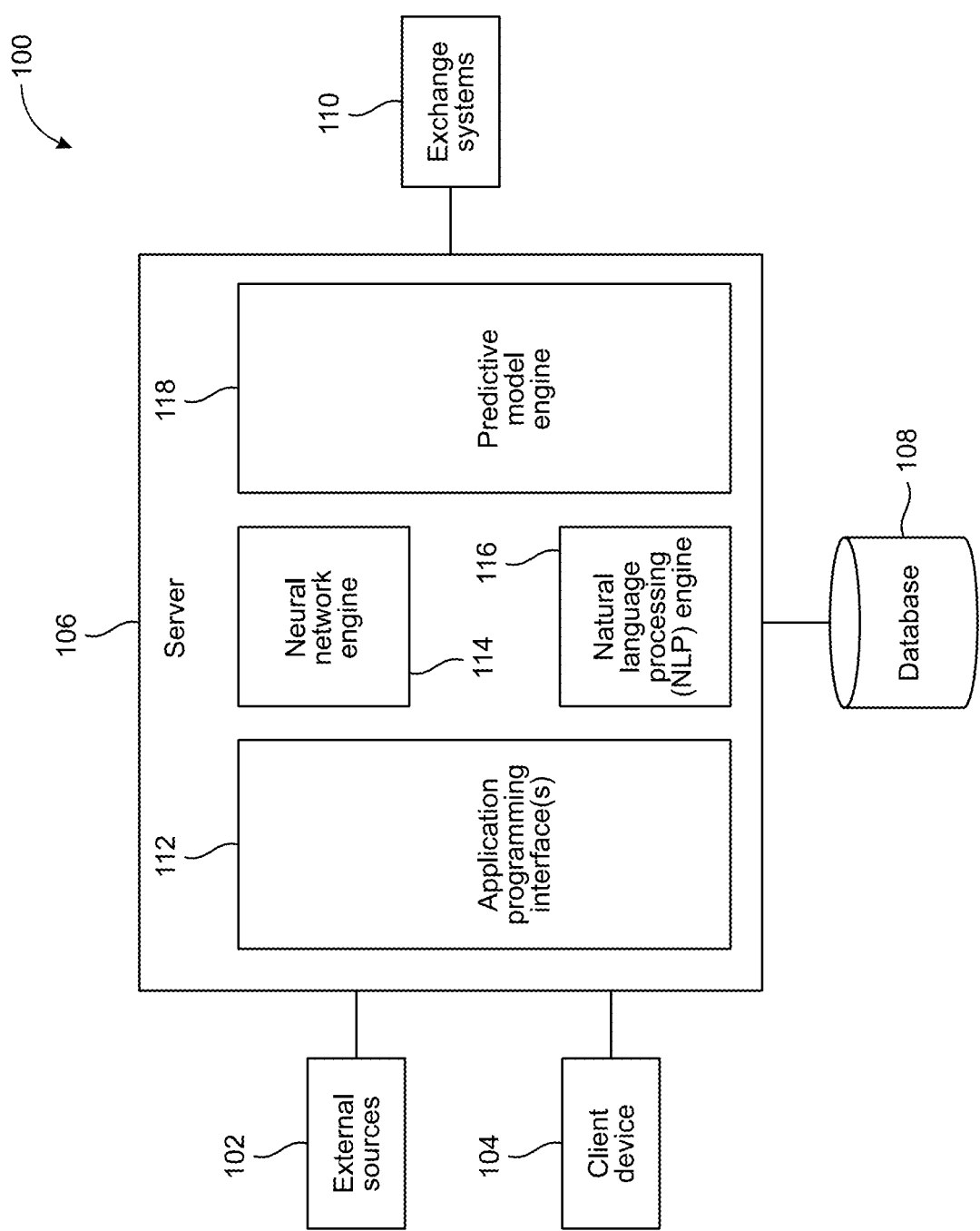
FIG. 1 illustrates a block diagram of a system for managing financial instruments according to some implementations of the present disclosure.

While the present disclosure is susceptible to various modifications and alternative forms, specific implementations have been shown by way of example in the drawings and will be described in detail herein. It should be understood, however, that the present disclosure is not intended to be limited to the particular forms disclosed. Rather, the present disclosure is to cover all modifications, equivalents, and alternatives falling within the spirit and scope of the present disclosure as defined by the appended claims.

DETAILED DESCRIPTION

Algorithmic trading is handled by object oriented software that operate based on a predefined instruction set. The predefined instruction set provides actions that the object oriented software takes in the event of an upward or downward movement in financial markets. Typically, most of these software currently operating execute similar actions or tend to work in concert, which can have an adverse effect of leading to market instability. For example, this concerted effort was one of the contributors to the 2008 economic crisis and recession. As such, investment bankers and other trading firms have been researching to devise methods of enhancing intelligence of algorithmic trading software.

Embodiments of the disclosure provide artificial intelligence (AI) enabled algorithmic trading. AI enabled algorithmic trading can provide several advantages over current systems, e.g., AI enabled algorithmic trading is able to independently perform an activity end-to-end without any human intervention. AI enabled algorithmic trading can be a substitute for providing services concerning trading analysis, equity analysis, portfolio management, investment management, etc. Transferring these activities to an AI enabled algorithmic trading platform can significantly reduce human capital required in financial institutions, thus reducing labor costs associated with the aforementioned activities.

Embodiments of the present disclosure provide an online platform with simulated human intelligence for managing financial instruments. The online platform includes a trading software improvised with AI capability to intelligently learn from domain-specific data and operate independently with certain sensibilities of an expert human trader. The online platform enables users to submit investments, and in return, the online platform trades on behalf of the user to obtain acceptable results over a period of time. Examples of acceptable results can include results based on specific performance of financial instruments (e.g., results based on a 2% return over a period of time, a 4% return over the period of time, a 5% return over the period of time, a 10% return over the period of time, etc.). In some embodiments, the online platform includes a pre-trained decision model that acts like a "cautious trader" to arrive upon trading decisions. The decision model coupled with a unique arrangement of other software components mimic performance of an actual human trader. This behavior is much different from that of a high frequency trading software. Embodiments of the present disclosure improve computer technology by providing an online platform running on a computer infrastructure that combines structured and unstructured data to perform automated trading. The online platform can consider, analyze, and comprehend far more data than any single human. The online platform can also analyze data in a manner that does not fall prey to pitfalls of high frequency trading software, since the online platform captures some human intuition that can be utilized while trading.

FIG. 1 illustrates a block diagram of a system 100 for managing financial instruments according to some implementations of the present disclosure. To simplify discussion, the singular form will be used for components identified in FIG. 1 when appropriate, but the use of the singular does not limit the discussion to only one of each such component. The system 100 includes a client device 104, one or more external sources 102, a server 106, a database 108, and one or more exchange systems 110. Each of these components can be realized by one or more computer devices and/or networked computer devices. The computer devices include at least one processor with at least one non-transitory computer readable medium storing instructions that are executable by the processor.

The client device 104 is any device that can connect to the server 106 for adjusting settings on the server 106. The client device 104 can be a laptop computer, a desktop computer, a smartphone, a smart speaker, a smart television, etc. The external sources 102 are computer devices, servers, or databases that contain information not controllable by the server 106. The external sources 102 can be information systems of news agencies, social media companies, financial news agencies, companies, expert blogs, etc. Examples of external sources 102 include computing systems operated by Bloomberg®, Twitter®, Fox News®, CNN®, Facebook®, etc.

The exchange systems 110 are computer devices, servers, or databases that permit changes to holdings of financial instruments or changes to portfolios. Exchange systems 110 include computer systems operated by financial service institutions, e.g., banks, investment banks, asset management companies, etc. Examples of exchange systems 110 can include systems operated by NYSE, NASDAQ, CME Group, Fidelity Investments, Vanguard, Charles Schwab, Chase bank, Bank of America, Acorn, etc.

The system 100 scours information from the external sources 102 to manage financial instruments by directly instructing the exchange systems 110 based on decisions determined by the server 106. The system 100 can include the database 108 for information storage. The server 106 includes one or more application programming interfaces (APIs) 112, a neural network engine 114, a natural language processing (NLP) engine 116, and a predictive model engine 118. An engine is a combination of hardware and software configured to perform specific functionality.

The APIs 112 enable the server 106 to interface with the external sources 102, the client device 104, the exchange systems 110, the database 108, or any combination thereof. The APIs 112 package data being sent from the server 106, such that a destination system receiving the data can understand contents in the data. Similarly, the APIs 112 receive packaged data from originating systems and convert the received data to formats that the server 106 can understand. Examples of APIs 112 include chatbox APIs that enable textual communication between the client device 104 and the server 106 so that the server 106 can receive text commands or text data from the client device 104. APIs 112 can also include an exchange connector API that enables the server 106 to issue commands to a stock exchange (an example of the exchange systems 110) for buying or selling stocks. APIs can also include JavaScript or other language-based APIs that enable importing of structured data, such as financial time series data from a stock exchange, a bank, or some other institution (examples of the external sources 102). Although shown separately, some computing systems can act as both a source of information (the external sources 102) and a mechanism to adjust assets in the real world (the exchange systems 110). For example, an exchange can be hosted on an online banking website which includes news snippets or summaries, and the server 106 can receive the news snippets or summaries and use information contained therein to inform a trade or decision made on the exchange.

The server 106 includes the neural network engine 114. The neural network engine 114 is configured to obtain structured data sourced from the external sources 102 to generate a prediction of future values (or states) of the structured data. The neural network engine 114 can include a recurrent neural network (RNN), a long short term memory (LSTM) artificial RNN, etc. Raw, structured data can be obtained by the neural network engine 114. The neural network engine 114 can include pre-processing scripts that transform the raw, structured data into different formats. For example, the pre-processing scripts can transform the raw, structured data using statistical methods to obtain arithmetic attributes and functions. For example, when the structured data includes prices of a financial instrument over time, the pre-processing scripts can determine: (1) exponential moving average (EMA) of the prices, daily closing prices, moving average convergence/divergence oscillator (MACD) for the prices, MACD signal(s) for the prices, volume weighted moving average (VWMA) for the prices, simple moving average (SMA) for the prices, relative strength index (RSI) for the prices, stochastic oscillators for the prices (e.g., stochOSR_fastK, stochOSR_fastD, stochWPR, etc.), or any combination thereof. Although the previous measures are recited in terms of prices of financial instruments, the concepts or attributes can be extracted for any type of time-series data.

The neural network engine 114 can use time-series data for training a neural network model. For example, the structured data includes time-series data of prices of financial instruments changing over time, and the time-series data can be used to train the neural network model. Time-series data obtained includes historical data since the time-series data includes prices at various timestamps and not just at a present timestamp. As such, in some implementations, the neural network engine 114 can use a windowing function to limit how far back prices should be considered. That is, the neural network engine 114 can consider only prices within a certain time period and not consider prices older than a certain timestamp. For example, the neural network engine 114 can consider prices within 3 days, 5 days, 7 days, 2 months, 10 months, 1 year, 10 years, etc. The time-series data, once limited with a windowing function, can be divided into different groups for training the neural network model. That is, the neural network engine 114 can use the different groups to train the neural network model where each of the groups is introduced at different times for training the neural network model. Although the time-series data used for training is described as prices of financial instruments, other metrics derived from the prices of the financial instruments can be used as time-series data for training the neural network model.

In some implementations, the neural network engine 114 maintains an RNN model, specifically, an LSTM model. The LSTM model is trained using historical data, such that the LSTM model identifies one or more relationships between various parameters in the historical data. Once trained, the LSTM model can be used for prediction according to some implementations of the present disclosure. The historical data, provided as input for training the LSTM, can be technical indicators (e.g., EMA, SMA, closing prices, MACD signals, etc., as previously described) of a financial instrument under consideration, and output of the LSTM model can be a predicted price of the financial instrument.

The neural network engine 114 is further configured to ensure that the neural network model is current. That is, the neural network engine 114 continually trains the neural network model with new training data. The continual training can be performed in specified time intervals, e.g., every 2 hours, every 3 hours, every 4 hours, every 6 hours, every 8 hours, 1 day etc.

In some implementations, the neural network engine 114 runs every 4 hours to obtain recent EMA, closing price, MACD, and MACD signal from updated data obtained from the external sources 102. Additionally, the neural network engine 114 can window the last 5 time series attributes for closing price, MACD, and MACD signal. Using these selected attributes, the neural network engine 114 can update the neural network model.

The neural network engine 114 can elicit from the neural network model a predicted closing price for a future timestamp and/or a predicted or extrapolated trend against time for the closing price. The neural network engine 114 can calculate a variance of the predicted closing price via:

$$\text{Variance} = \frac{currentPrediction - previousData}{previousData} \times 100$$

Variance calculated at specific time instances can be stored in the database 108. currentPrediction is the predicted closing price for a future timestamp, and previousData indicates a known closing price at a specific timestamp. In some implementation, previousData is the most recently obtained closing price. Once calculated, the neural network engine 114 stores the variance and marks a time instance when the variance was calculated. In some implementations, the neural network engine 114 can further normalize variance calculations such that the variance output is limited to be between +1 and −1.

The server 106 includes the NLP engine 116. The NLP engine 116 is configured to parse unstructured data obtained from the external sources 102. The NLP engine 116 generates a sentiment measure from the unstructured data. The NLP engine 116 can use one or more algorithms for sentiment analysis (e.g., support vector machine, naïve Bayes, maximum entropy classifier, etc.). The NLP engine 116 can generate the sentiment measure by analyzing words within the unstructured data to determine whether the words are positive, negative, or neutral.

Examples of phrases with positive sentiment scores include: {"Retail Investors are piling-up long term treasury bonds", "It is highly likely that there would be a share buy-back by the board", "Investors are hoarding Gold Futures due to the ongoing corona pandemic crisis", "Investment Banks have increased their position in Short-Term Corporate Bond ETF's", "It is expected that oil prices would spike higher after OPEC plus cut global oil production by a record amount", "Gold is Still Bull in the Market", "The Federal Reserve Announces New and Expanded Liquidity Facilities to Provide $2.3 Trillion in Funding, boosting investor confidence in the markets"}.

Examples of phrases with negative sentiment scores include: {"There has been panic selling in the market since last few days", "Investors are dumping Oil Futures due to the ongoing geo-political crisis", "Analysts predict that there would be a dip in the demand for crude oil very soon", "It is likely that the CEO would resign today", "The World Economy is in a Free Fall", "S&P 500 index futures fell as much as 5 percent, triggering exchange circuit breakers", "The share price is expected to collapse due to the firm filing for bankruptcy", "Stocks slide as IMF warns of coronavirus growth standstill", "Boeing stock down 25% as credit rating cut", "Markets brace for biggest losses since the 2008 recession"}.

Example phrases with neutral sentiment scores include: {"Experts are of different opinion on when the markets would recover", "Conflicting information continues to pile up in financial markets, making a confusing picture for investors and the rest of the world", "Most firms are conserving cash"}.

The NLP engine 116 can update the sentiment measure over time, e.g., the sentiment measure can be updated every hour, every 2 hours, every 4 hours, every 8 hours, 1 day etc. The NLP engine 116 can weight unstructured data from different sources when determining the sentiment measure of the obtained unstructured data. For example, sentiment scores for a financial instrument can be calculated from text obtained from external source 1, external source 2, external source 3, and external source 4. The sentiment scores can be calculated using one or more algorithms including, for example, support vector machine, naïve Bayes, maximum entropy classifier, etc. The sentiment scores for each of the external sources can be combined via a weighted average. For example, the following equation can be used in obtaining the weighted average.

$$\text{sentiment measure} = \sum_{i=1}^{N} a_i \times \text{sentiment score}_i, \text{ given that } \sum_{i=1}^{N} a_i = 1$$

Where $a_i$ is the weight of the ith external source and sentiment score$_i$ is the sentiment score for the ith source. In an example, an event can spur articles to be written in news sources like Bloomberg, CNN, CNBC, etc. The event can also spur social media mentions via Twitter, Facebook, Instagram, etc. Services like Webhose can also provide access to news feeds, mentions, articles and voice transcripts from other sources. Each of these articles and mentions are analyzed by the NLP engine 116 to obtain sentiment scores. After obtaining the sentiment scores, each sentiment score is weighted by a weight associated with the source. For example, the NLP engine 116 can have Bloomberg have a weight of 0.3, CNN a weight of 0.5, Webhose a weight of 0.1, Twitter a weight of 0.06, Facebook a weight of 0.01, and so on. The weights must add up to 1 in some implementations, so are distributed in a manner such that more trusted sources are weighted higher than less trusted sources.

The sentiment measure can be calculated for different time instances and stored in the database 108. By having previous sentiment measures at different instances, fluctuation of the sentiment measures can be determined using the equation below.

$$\text{Fluctuation} = \frac{currentSentimentMeasure - previousSentimentMeasure}{|previousSentimentMeasure|} \times 100$$

currentSentimentMeasure is sentiment measure calculated at a most recent time instance, and previousSentimentMeasure is sentiment measure calculated at a previous time instance. The NLP engine 116 can provide fluctuation of the sentiment measure over time. In some implementations, the NLP engine 116 can further normalize fluctuation calculations such that the output is limited to be between +1 and −1.

The server 106 includes the predictive model engine 118. The predictive model engine 118 deduces from the neural network model trained by the neural network engine 114 and the sentiment analysis performed by the NLP engine 116 a decision on how to proceed with the financial instrument. The decision can include whether to buy the financial instrument, sell the financial instrument, or hold the financial instrument. The scaled variance from the neural network engine 114 and the fluctuation from the NLP engine 116 is used by the predictive model engine 118 to determine the decision. The predictive model engine 116 can further use other system parameters to arrive at the decision. These other system parameters can include customized rules. The predictive model engine 116 can use multi-variate regression to determine the decision. After the decision is determined, the server 106 executes steps to realize the decision on the exchange systems 110 via the APIs 112.

In some implementations, the predictive model engine 118 maintains a statistical regression model that takes as input variables the variance from the neural network engine 114, sentiment fluctuation from the NLP engine 116, and state of the financial instrument under consideration (profit, loss or cash). The output of the statistical regression model is a trading decision which includes buying, selling or holding the financial instrument. Prior to using the statistical regression model for prediction, the predictive model engine 118 trains the statistical regression model using a training data set which includes both input variables (i.e., both variance, fluctuation, and/or state) and output variables (i.e., trading actions including buying, selling, or holding). The training data set represents real-world situations of ideal trading actions a human trader would have taken subject to various combinations of the input variables. The types of modeling described herein is an example of multi-variate regression.

In some implementations, the input variables of the training dataset used to train the statistical regression model include a metric from the neural network engine 114, a metric from the natural language processing engine 116, and a state of the investment. The output variable of the training data is the trading action. The training dataset can be represented as a table which includes the following example datapoints: {Trading action=BUY, neural network metric=1, natural language processor metric=1, state of investment=profit}, {Trading action=HOLD, neural network metric=−0.75, natural language processor metric=1, state of investment=profit}, Trading action=SELL, neural network metric=−1, natural language processor metric=0.25, state of investment=profit}, Trading action=HOLD, neural network metric=−1, natural language processor metric=0.5, state of investment=loss}, etc. The training dataset can be generated based on a series of rules.

Figure 2:
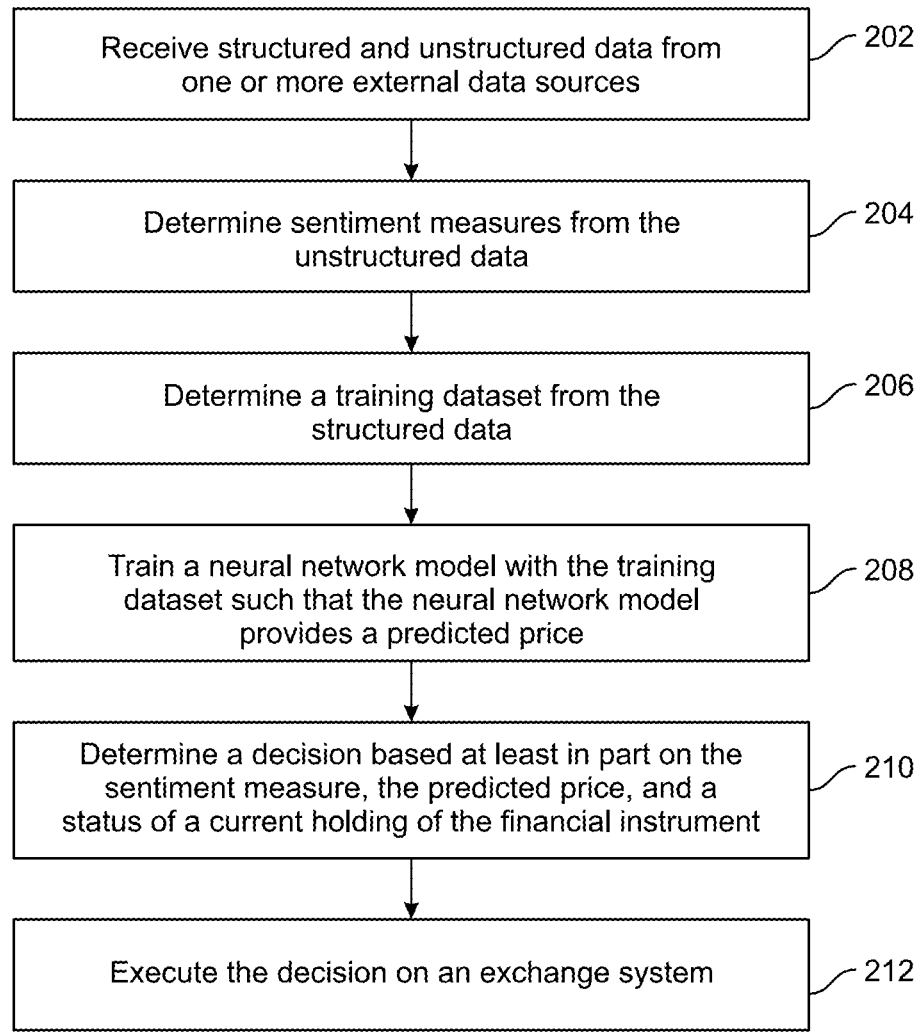
FIG. 2 is a flow diagram showing steps for managing financial instruments according to some implementations of the disclosure.

FIG. 2 is a flow diagram showing steps for managing financial instruments according to some implementations of the disclosure. The steps in FIG. 2 can be implemented by the server 106. At step 202, the server 106 receives structured and unstructured data from the external sources 102. The structured data can be time-series data as already described in connection with FIG. 1. That is, for a financial instrument, the structured data can include prices of the financial instrument over a time period. The unstructured data can be articles, social media mentions, news feeds, blogs, web pages, discussion forums, social media comments, etc. The unstructured data can include words in title format, words in sentence format, words in paragraph format, etc.

At step 204, the server 106 determines sentiment measures from the unstructured data. The server 106 can determine sentiment scores and then combine the sentiment scores to determine sentiment measures. The sentiment measures can be determined at different time instances as previously described in connection with FIG. 1.

At step 206, the server 106 determines a training dataset from the structured data. The structured data can include historical data associated with the financial instrument of interest and current data associated with the financial instrument of interest. The historical data can include prices from previous timestamps and current data can include price at a current timestamp. The training dataset can include pre-processed attributes as previously described in connection with FIG. 1. That is, the training dataset can include EMA, SMA, MACD, etc.

At step 208, the server 106 trains a neural network model with the training dataset such that the neural network model can provide a predicted price of the financial instrument for a future timestamp, given the price of the financial instrument at the current timestamp.

At step 210, the server 106 determines a decision based at least in part on the sentiment measure, the predicted price, and a status of a current holding of the financial instrument. The decision provided is whether to increase a number of shares of the financial instrument, decrease the number of shares of the financial instrument, or hold the number of shares of the financial instrument constant. That is the decision is a buy, sell, or hold decision. The server 106 determines the decision as previously described in connection with FIG. 1 using a calculated variance and a calculated fluctuation. Also as discussed in connection with FIG. 1, the decision can be based on an output from a statistical regression model trained.

The current holding of the financial instrument is a current state of shares of the financial instrument. The current holding can affect the decision in various ways, e.g., if the number of shares is zero, then the decision cannot be a sell because there are no shares to sell. In some implementations, the current holding of the financial instrument can also include a status of investing in the financial instrument. For example, the status of investing can include whether the investment in the financial instrument is currently at a loss or at a profit. In some implementations, the status can further include how much cash is available to invest in the financial instrument when considering a buy decision.

In some implementations, the decision is further based on a set of customized rules. The server 106 can obtain the customized rules from the database 108. An example of a customized rule includes that the decision for managing the financial instrument is based on a previous decision such that consecutive decisions or subsequent decisions are opposites. For example, a rule that buying the financial instrument cannot follow another buy action can be included in the set of customized rules. Similarly, two consecutive sells can be programmed to be avoided. The server 106 when interpreting this rule can determine that a buy action should follow a sell action or vice versa.

The set of customized rules can further include a rule that a minimum profit percentage be obtained before selling shares of the financial instrument. That is, when the decision is determined to be sell based on other factors, the server 106 will ensure that the sell price for the shares is above the price when the shares were bought. That way, a profit is ensured. Configuration data indicating a percentage of what this profit should be can be stored in the database 108. In some implementations, the percentage can be set at 0.5% so that the sell price should be at least 0.5% higher than the price paid for the shares. Other examples for the percentage include 0.1%, 0.25%, 1%, etc.

The set of customized rules can further include a rule for trading in light of maturity dates. Once investment in the financial instrument reaches a maturity date, the server 106 can verify an action on maturity setup for the investment. If the action on maturity setup indicates that the investment should be closed, then the server 106 determines that the decision is selling off all the shares. If the action on maturity setup indicates that reinvesting is the course of action, then the maturity date is ignored and the investment is left open for a duration past the maturity date. The duration can be finite, for example, 2 months, 3 months, 1 year, 5 years, etc.

The set of customized rules can further include that profits made from the investment should only be available to an owner of the investment only when the investment has matured. As such, the server 106 can determine that a sell decision should not touch appreciated asset value or that a sell decision should not be made until maturity.

The set of customized rules can further include a maximum loss rule. For example, the maximum loss rule can be no losses beyond 5% of an initial value of the investment. The server 106 can determine that the maximum loss is reached and that the decision should be a sell.

The set of customized rules can further include that profit share is accessible to an owner of the investment based on the configuration given for the investment. That is, investment level checks can be placed. Profits can be shared back to the owner at the instant at which the profit is generated, rather than on a maturity date. This feature can be enabled for only a specific set of investment owners (e.g., high value investors, long-term investors, etc.). Embodiments of the present disclosure thus provide a set of rules with a feature of providing an instant credit of profits generated to the owner, rather than making the owner wait until investment maturity.

The set of customized rules can further include settings related to manual intervention. For example, the server 106 can manage the financial instrument, but once the client device 104 indicates that the server 106 stop automatically trading in the financial instrument, the server 106 can cease all trades. Even with cessation in trades, the server 106 can be configured to automatically close out investments upon maturity. That is, if stocks were bought then the server should sell off and then add the invested amount (including profit or loss) to a wallet such that the owner can access the funds. If the investment were in a cash state, then the server should add the invested amount (including profits) to the wallet such that the user can access the funds.

At step 212, the server 106 executes the decision on the exchange systems 110 via the APIs 112.

Figure 3:
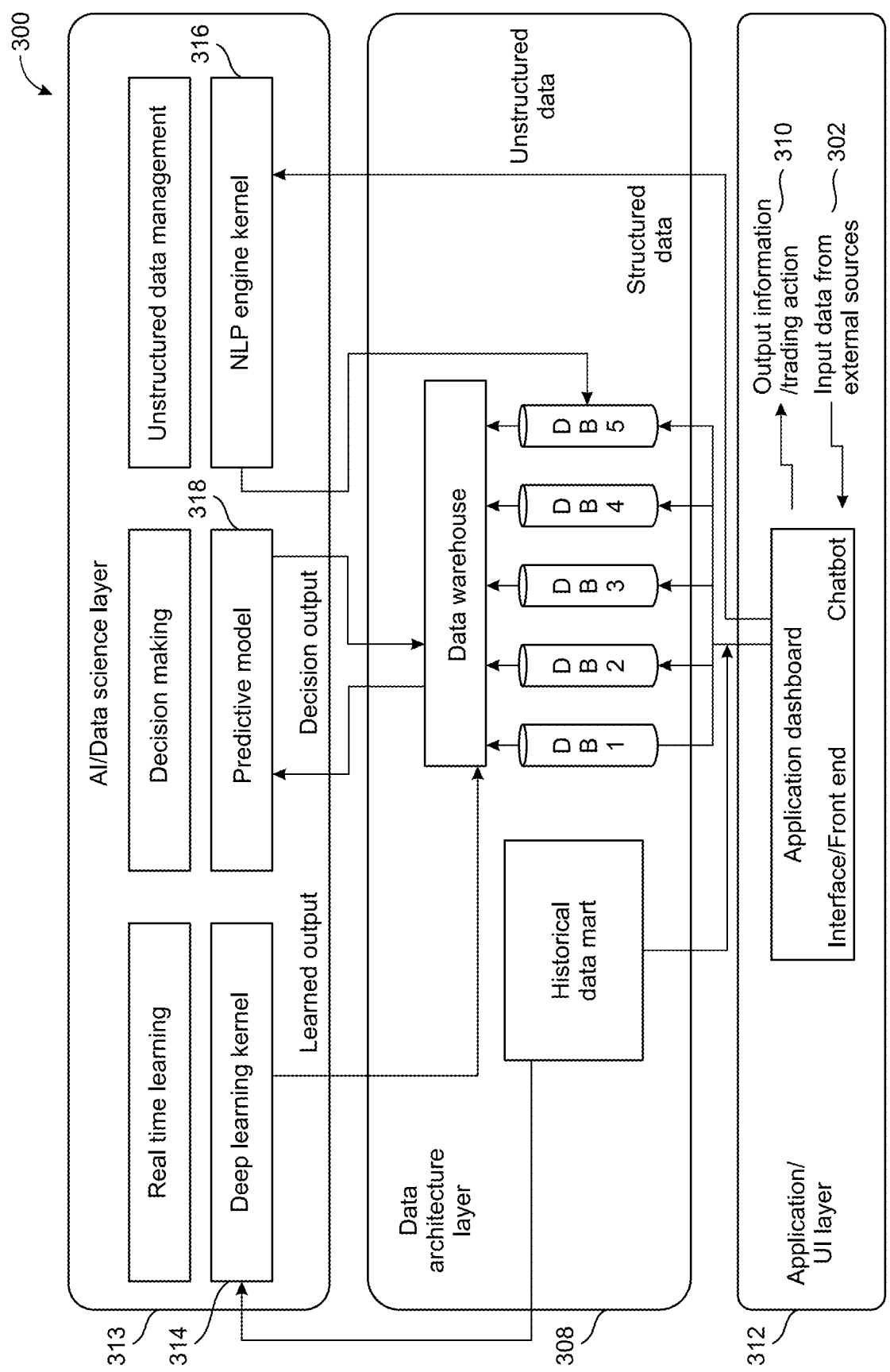
FIG. 3 illustrates an example system architecture for managing financial instruments according to some implementations of the present disclosure.

FIG. 3 illustrates an example system architecture 300 for managing financial instruments, according to some implementations of the present disclosure. The system architecture 300 includes an application/user interface (UI) layer 312 that facilitates communication to obtain input data from external sources 302 and provide output information/trading action 310 to exchange systems (e.g., the exchange systems 110).

The application/UI layer 312 can include an application dashboard with an interface and front end and a chatbox. Structured data obtained by the application/UI layer 312 is provided to the data architecture layer 308. The data architecture layer 308 can include a historical data mart, a data warehouse, and one or more databases that feed data to the data warehouse. The historical data mart stores historical data used for training a neural network model by a deep learning kernel 314. The deep learning kernel 314 is similar to or the same as the neural network engine 114 previously described in connection with FIG. 1. The deep learning kernel 314 provides real-time learning as structured data is continually received by the application/UI layer 312.

Unstructured data obtained by the application/UI layer 312 is provided to the AI/data science layer 313, specifically, to an NLP engine kernel 316 of the AI/data science layer 313. The NLP engine kernel 316 is similar to or the same as the NLP engine 116 previously described in connection with FIG. 1. The NLP engine kernel 316 provides unstructured data management and can write to the database, structured data (e.g., fluctuation) obtained from the unstructured data.

The data architecture layer 308 provides a centralized storage solution such that learned output from the deep learning kernel 314 is stored at the data warehouse. The data warehouse provides current predictions or the learned output to the predictive model 318. The predictive model 318 is similar to or the same as the predictive model engine 118 as described in connection with FIG. 1. The predictive model 318 determines a decision based on the learned output obtained from the data warehouse and any data provided by the NLP engine kernel 316 to the database. The decision determined is shown as "decision output" which is then acted upon as the output information/trading action 310.

Figure 4:
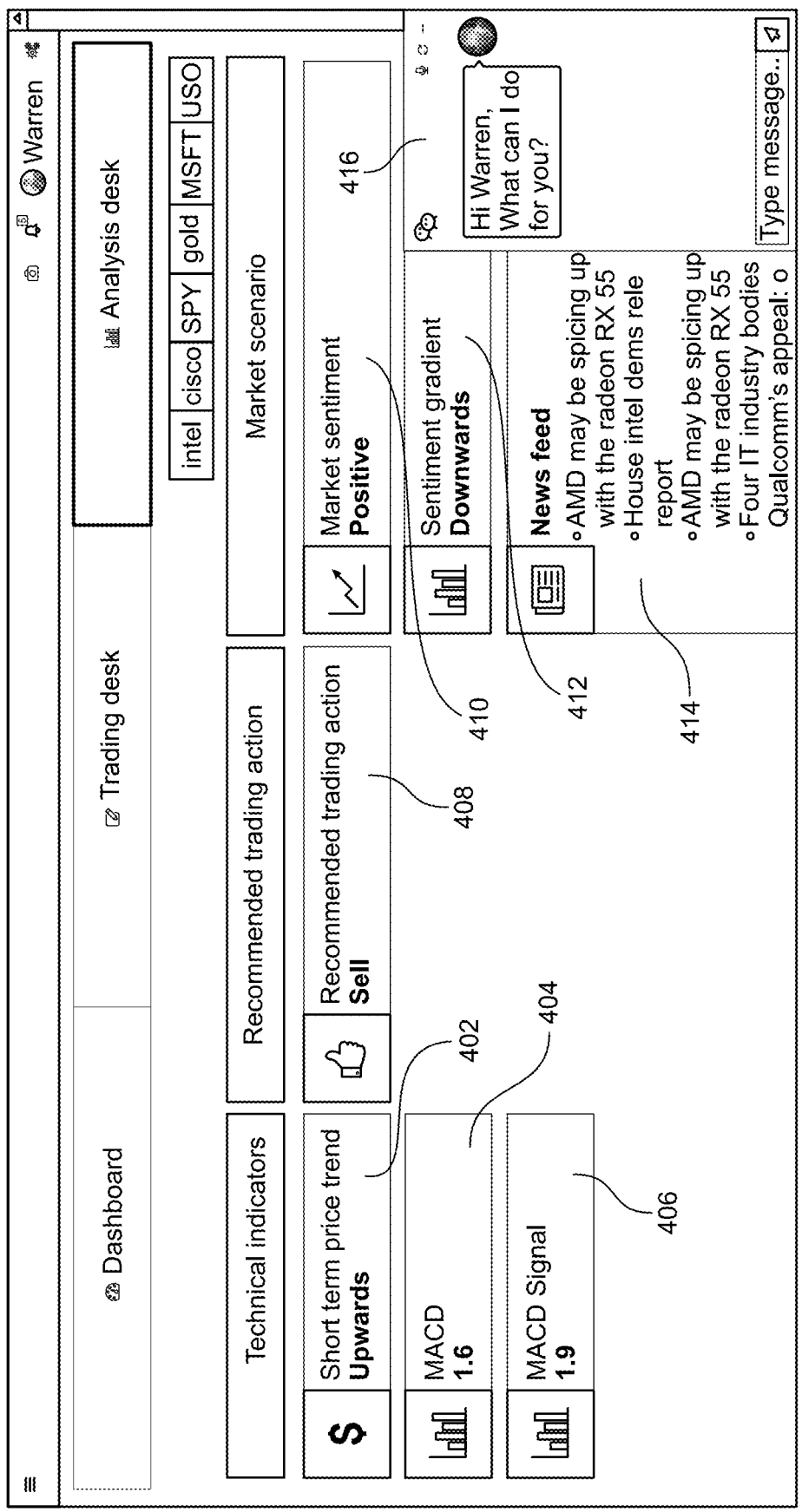
FIG. 4 illustrates a screenshot of a user dashboard according to some implementations of the present disclosure.

FIG. 4 illustrates a screenshot of a user dashboard according to some implementations of the present disclosure. The client device 104, via the APIs 112, can obtain data for display on a screen of the client device 104. The client device 104 can graphically display technical indicators showing that the server 106 indicates that the short term price trend 402 is upwards. The client device 104 can also display statistical metrics, e.g., the MACD 404 and the MACD signal 406. The client device 104 can also display a decision made by the server 106, i.e., the recommended trading action 408. The client device 104 can also display market sentiment 410 (i.e., sentiment measure) and a trend for the market sentiment 412 (i.e., fluctuation). Furthermore, the client device 104 can display a news feed 414 showing some or all articles that the sentiment analyses is based on. The client device 104 can also display a chat interface 416 for providing commands to the server 106. Although the client device 104 does not need to interfere with financial instrument management provided by the server 106, the client device 104 provides a user the ability to interrupt the server 106.

FIGS. 5A-5F illustrate sections of a table showing different trading actions based on an implementation of the present disclosure. In generating, FIGS. 5A-5F, a proof of concept is provided where neural network recommendations, natural language processing recommendations, and a state of an investment are used to determine trading actions.

Embodiments of the present disclosure provide several advantages. For example, an end-to-end fully automated trading with no dependency on manual intervention is enabled by some implementations of the present disclosure. Some implementations of the present disclosure mitigate financial risk to promote stable returns of a financial instrument in a financial market. Some implementations of the present disclosure are completely online thus can be implemented using simple user interface designs. Some implementations of the present disclosure provide an interactive chatbot assistant for communicating with users on decisions and/or statuses related to the financial instrument. Some implementations of the present disclosure provide a plug and play platform architecture for enabling trading on multiple asset classes.

Some applications of embodiments of the present disclosure include reduced-risk investing, convenient savings tool, AI trading, retirement planner, portfolio management, financial management, etc.

According to some embodiments of the present disclosure, processes described above with reference to flow charts or flow diagrams (e.g., in FIGS. 2-3) may be implemented in a computer software program. For example, some embodiments of the present disclosure include a computer program product, which includes a computer program that is carried in a computer readable medium. The computer program includes program codes for executing the processes of FIGS. 2 and/or 3. The computer program may be downloaded and installed from a network (e.g., the Internet, a local network, etc.) and/or may be installed from a removable medium (e.g., a removable hard drive, a flash drive, an external drive, etc.). The computer program, when executed by a central processing unit implements the above functions defined by methods and flow diagrams provided herein in the present disclosure.

A computer readable medium according to the present disclosure may be a computer readable signal medium or a computer readable storage medium or any combination of the above two. Examples of the computer readable storage medium may include electric, magnetic, optical, electromagnetic, infrared, or semiconductor systems, elements, apparatuses, or a combination of any of the above. More specific examples of the computer readable storage medium include a portable computer disk, a hard disk, a random access memory (RAM), a read only memory (ROM), an erasable programmable read only memory (EPROM or flash memory), an optical fiber, a portable compact disk read only memory (CD-ROM), an optical memory, a magnetic memory, or any suitable combination of the above.

The computer readable storage medium according to some embodiments may be any tangible medium containing or storing programs, which may be used by, or used in combination with, a command execution system, apparatus or element. In some embodiments of the present disclosure, the computer readable signal medium may include a data signal in the base band or propagating as a part of a carrier wave, in which computer readable program codes are carried. The propagating data signal may take various forms, including but not limited to an electromagnetic signal, an optical signal, or any suitable combination of the above. The computer readable signal medium may also be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium, including but not limited to: wireless, wired, optical cable, RF medium, etc., or any suitable combination of the above.

A computer program code for executing operations in the present disclosure may be compiled using one or more programming languages or combinations thereof. The programming languages include object-oriented programming languages, such as Java or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or electronic device. In the circumstance involving a remote computer, the remote computer may be connected to a user's computer through any network, including local area network (LAN) or wide area network (WAN), or be connected to an external computer (for example, connected through the Internet using an Internet service provider).

The flow charts and block diagrams in the accompanying drawings illustrate architectures, functions and operations that may be implemented according to the systems, methods and computer program products of the various embodiments of the present disclosure. Each of the blocks in the flow charts or block diagrams may represent a program segment or code that includes one or more executable instructions for implementing specified logical functions. It should be further noted that, in some alternative implementations, the functions denoted by the flow charts and block diagrams may also occur in a sequence different from the sequences shown in the figures. For example, any two blocks presented in succession may be executed substantially in parallel, or sometimes be executed in a reverse sequence, depending on the functions involved. It should be further noted that each block in the block diagrams and/or flow charts as well as a combination of blocks in the block diagrams and/or flow charts may be implemented using a dedicated hardware-based system executing specified functions or operations, or by a combination of dedicated hardware and computer instructions.

Engines, handlers, generators, managers, or any other software block or hybrid hardware-software block identified in some embodiments of the present disclosure may be implemented by software, or may be implemented by hardware. The described blocks may also be provided in a processor, for example, described as: a processor including an application programming interface, a neural network engine, a natural language processing engine, a predictive model engine, etc.

While the present disclosure has been described with reference to one or more particular implementations, those skilled in the art will recognize that many changes may be made thereto without departing from the spirit and scope of the present disclosure. Each of these embodiments and implementations and obvious variations thereof is contemplated as falling within the spirit and scope of the present disclosure, which is set forth in the claims that follow.

What is claimed is:

1. A computing system for autonomously managing financial instruments using domain-specific data, the computing system including a hardware processor, a database, and a non-transitory computer-readable medium storing computer-executable instructions thereon such that when the instructions are executed by the hardware processor, the computing system is configured to:
   retrieve, via at least one application programming interface (API), structured and unstructured data from one or more external data sources, the structured data including time-series data on a financial instrument and the unstructured data including words of titles, sentences, paragraphs, or any combination thereof;
   convert, by the at least one API, the retrieved structured and unstructured data to understandable formats, the retrieved structured and unstructured data being stored in the database;
   analyze, via the hardware processor, the unstructured data using natural language processing algorithms of a natural language processing (NLP) engine of the computing system to determine sentiment scores associated with each of the words in the unstructured data;
   combine, via the hardware processor, the sentiment scores using the NLP engine to determine a sentiment measure for the financial instrument, the sentiment measure indicating whether the words in the unstructured data have an overall positive, negative, or neutral connotation;
   analyze, via the hardware processor, the structured data to obtain a training dataset, the structured data including historical data associated with the financial instrument and current data associated with the financial instrument, wherein historical data pertains to data describing prices of the financial instrument in one or more previous timestamps and current data pertains to data describing price of the financial instrument at a current timestamp;
   train, via the hardware processor, a neural network model with the training dataset in real-time as new structured data including time-series data on the financial instrument that is continually received via the at least one API such that the neural network provides a predicted price of the financial instrument for a future timestamp given the price of the financial instrument at the current timestamp;
   determine, via the hardware processor, a variance associated with the predicted price of the financial instrument using the predicted price of the financial instrument and a current price of the financial instrument included in the current data;
   determine autonomously, via the hardware processor without human input, a decision for managing the financial instrument using a statistical regression model and wherein the determined decision is based at least in part on the sentiment measure for the financial instrument, the predicted price of the financial instrument, the determined variance associated with the predicted price of the financial instrument, and a current holding of the financial instrument;
   execute, via the at least one API, autonomously without human input the decision with one or more exchange systems by sending commands relating to the current holding of the financial instrument to the one or more exchange systems; and
   send, via the at least one API, the decision to a client device to cause the client device to display information representative of the decision on a screen of the client device.

2. The system of claim 1, wherein the decision for managing the financial instrument is further based on a fluctuation of the sentiment measure for the financial instrument.

3. The system of claim 1, wherein the decision for managing the financial instrument is one of a buy decision, a sell decision, or a hold decision.

4. The system of claim 1, wherein the hardware processor executing the computer-executable instructions further configures the computing system to:
   update the structured and unstructured data by continually retrieving subsequent data from the one or more external data sources.

5. The system of claim 4, wherein updating the structured and unstructured data is performed in certain intervals.

6. The system of claim 4, wherein the hardware processor executing the computer-executable instructions further configures the computing system to:
   update, via the hardware processor, the training dataset by analyzing the subsequent data; and
   train, via the hardware processor, the neural network with the updated training dataset.

7. The system of claim 1, wherein the neural network provides the predicted price based at least in part on statistics including exponential moving average (EMA), closing price, moving average convergence/divergence oscillator (MACD), MACD signal, volume weighted moving average (VWMA), simple moving average (SMA), or relative strength index (RSI).

8. The system of claim 1, wherein the historical data is limited to data from a certain interval of previous timestamps.

9. The system of claim 1, wherein the decision for managing the financial instrument is further based on a previous decision such that the previous decision and the decision are opposites.

10. The system of claim 1, wherein the decision for managing the financial instrument is further based on most recent buy prices of the financial instruments such that a minimum profit percentage is obtained.

11. The system of claim 1, wherein the decision for managing the financial instrument is further based on maturity dates of the financial instruments.

12. The system of claim 1, wherein the decision for managing the financial instrument is further based on maximum losses that the financial instruments can suffer.

13. The system of claim 1, wherein the external data sources include news sources and social media mentions, and combining the sentiment scores to determine the sentiment measure includes performing a weighted average of sentiment scores for the news sources and sentiment scores for the social media mentions, wherein a weighting associated with the news sources is greater than a weighting associated with the social media mentions.

14. The system of claim 1, wherein the statistical regression model is trained using a decision training dataset that includes both input variables and output variables, wherein the input variables include historical neural network metrics indicative of historical variances associated with the prices of the financial instrument in the one or more previous timestamps, historical language processor metrics indicative of fluctuation of historical sentiment measures associated with the financial instrument, and historical states of investment indicative of whether the financial instrument is at a profit or at a loss, and wherein the output variables include historical trading action indicative of a buy, a hold, or a sell.

15. The system of claim 1, wherein the hardware processor executing the computer-executable instructions further configures the computing system to:
   receive, from the database, a customized set of rules including a rule that an owner of the financial instrument has instant access to profits associated with the current holding of the financial instrument, and wherein the decision is further based on the customized set of rules.

16. The system of claim 1, wherein the hardware processor executing the computer-executable instructions further configures the computing system to:
   receive, from the client device via the at least one API, a cessation instruction to stop automated trades; and
   execute, via the at least one API, a sell decision with the one or more exchange systems upon a maturity date of the financial instrument.

* * * * *